(12) United States Patent
Kasahara

(10) Patent No.: US 7,235,911 B2
(45) Date of Patent: Jun. 26, 2007

(54) STEPPING MOTOR

(75) Inventor: Takashi Kasahara, Fukushima (JP)

(73) Assignee: Nidec Copal Corporation, Itabashi-ku, Tokyo (JP)

( * ) Notice: Subject to any disclaimer, the term of this patent is extended or adjusted under 35 U.S.C. 154(b) by 0 days.

(21) Appl. No.: 10/936,687

(22) Filed: Sep. 9, 2004

(65) Prior Publication Data

US 2005/0057105 A1    Mar. 17, 2005

(30) Foreign Application Priority Data

Sep. 11, 2003    (JP)    ............................ P.2003-319765

(51) Int. Cl.
*H02K 1/12*    (2006.01)
(52) U.S. Cl. ...................... 310/257; 310/49 R; 310/187
(58) Field of Classification Search ................ 310/254, 310/172, 187, 49 R, 49 A, 257–259
See application file for complete search history.

(56) References Cited

U.S. PATENT DOCUMENTS

| | | | | |
|---|---|---|---|---|
| 2,511,698 A | * | 6/1950 | Dickey | 318/695 |
| 3,383,534 A | * | 5/1968 | Ebbs | 310/257 |
| 3,634,707 A | * | 1/1972 | Tillner et al. | 310/172 |
| 3,719,842 A | * | 3/1973 | Kuntz | 310/164 |
| 4,546,278 A | * | 10/1985 | Xuan | 310/49 R |
| 4,794,292 A | * | 12/1988 | Torisawa | 310/257 |
| 5,097,162 A | * | 3/1992 | Wang | 310/49 R |
| 5,302,875 A | * | 4/1994 | Taghezout | 310/49 R |
| 6,765,320 B1 | * | 7/2004 | Suzuki et al. | 310/49 R |

FOREIGN PATENT DOCUMENTS

| | | |
|---|---|---|
| JP | A-49-56109 | 5/1974 |
| JP | A-50-14806 | 11/1975 |

* cited by examiner

*Primary Examiner*—Dang Le
(74) *Attorney, Agent, or Firm*—McGinn IP Law Group, PLLC

(57) ABSTRACT

A stepping motor includes: a magnet; a coil arranged concentrically with the magnet and to be opposed to a magnet, a predetermined clearance being provided between the magnet and the coil; and a magnetic member that surrounds the coil and includes a magnetic pole interposed between the magnet and the coil.

13 Claims, 5 Drawing Sheets

NON- EXCITED
STABILIZED POSITION
(ENERGIZATION OFF)

ENERGIZATION OFF

ENERGIZATION ON

ENERGIZATION ON

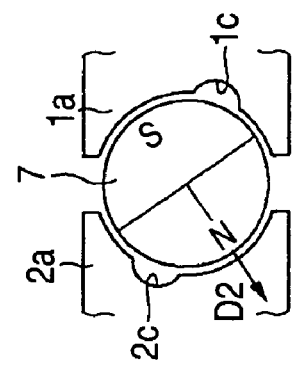
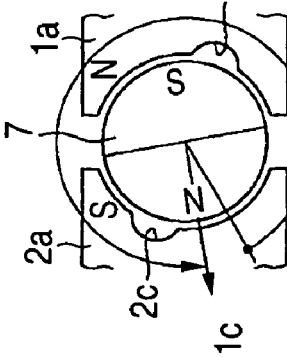
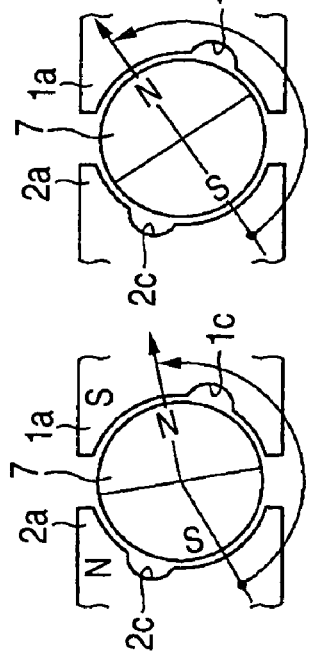
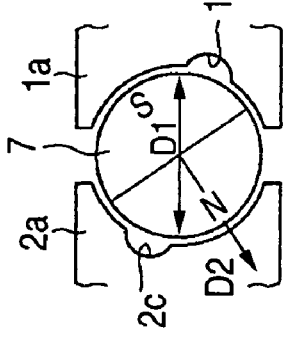

STEPPING MOTOR

BACKGROUND OF THE INVENTION

The present invention relates to a stepping motor for driving, for example, a timepiece or an electric fan.

In a related art, a stepping motor for a timepiece is known as a stepping motor which can be driven by a low current (refer to, for example, Patent Reference 1 and Patent Reference 2).

Patent Reference 1: JP-A-49-56109
Patent Reference 2: JP-A-50-145806

However, a stepping motor for a timepiece of a related art is constituted by: a coil wired to an iron core and having a rectangular outer shape; a coil yoke for leading a magnetic circuit from the coil to a rotor magnet; and the rotor magnet arranged to be opposed to the coil yoke, and constitutes unsymmetric shape relative to an rotating shaft fixed with the rotor magnet. Further, an outer shape of the coil yoke is obliged to enlarge due to low-current formation and there is a limit in reducing an occupied area thereof. Therefore, when the stepping motor is attached to a timepiece or the like, the coil yoke is obliged to attach thereto by being deviated to one space (one side), and other space (the other side) constitutes a dead space which is inefficient.

Further, when the stepping motor is used for driving an electric fan having a small moment of inertia, there is a drawback that a path for convecting air is blocked by the coil yoke or the like.

SUMMARY OF THE INVENTION

The invention has been carried out in view of the above-described problem and it is an object thereof to provide a stepping motor capable of reducing a dead space caused by an outer shape of a coil yoke and capable of realizing to drive to rotate by a low current and at a low revolution.

In order to solve the aforesaid object, the invention is characterized by having the following arrangement.
(1) A stepping motor comprising:
   a magnet;
   a coil arranged concentrically with the magnet and to be opposed to a magnet, a predetermined clearance being provided between the magnet and the coil; and
   a magnetic member that surrounds the coil and includes a magnetic pole interposed between the magnet and the coil.
(2) The stepping motor according to (1), wherein the magnetic member includes a first magnetic member in a shape of a thin plate provided with a first magnetic pole portion, and a second magnetic member in a shape of a cylinder provided with a second magnetic pole portion symmetrically with the magnetic pole portion relative to a center axis of the magnet.
(3) The stepping motor according to (2), wherein the first and the second magnetic pole portions are respectively provided with recessed portions for making clearances between the first and the second magnetic pole portion the magnet nonuniform, so that an electromagnetically stabilized position of the magnet when the coil is excited and a stabilized position when the coil is not excited are established.

As has been explained above, according to the invention, the magnet and the coil are arranged concentrically relative to the rotating shaft and therefore, in comparison with the constitution of the related art in which the magnet and the coil are arranged unsymmetrically relative to the rotating shaft, a dead space caused by an outer shape of a coil yoke can be reduced and the stepping motor can be realized to drive to rotate by low current and at low revolution.

BRIEF DESCRIPTION OF THE DRAWINGS

FIGS. 5A to 5E illustrate views for explaining operation of rotating the stepping motor according to the embodiment.

DETAILED DESCRIPTION OF PREFERRED EMBODIMENTS

An explanation will be given of a preferable embodiment of the invention in reference to the attached drawings as follows.

The embodiment explained below is an example for carrying out the invention and the invention is applicable to the embodiment, described below, modified within a range not deviated from a gist thereof.

Figure 1:
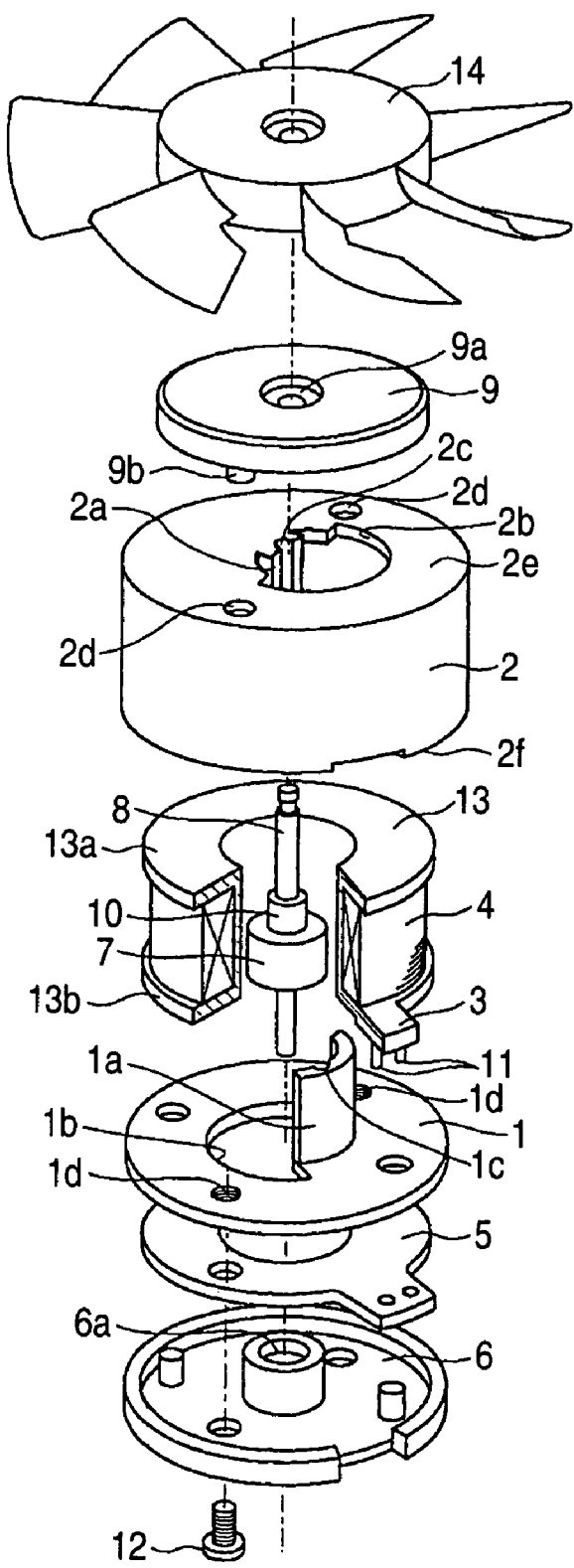
FIG. 1 is a disassembled perspective view of a single phase stepping motor of an embodiment according to the invention.
Figure 2A:
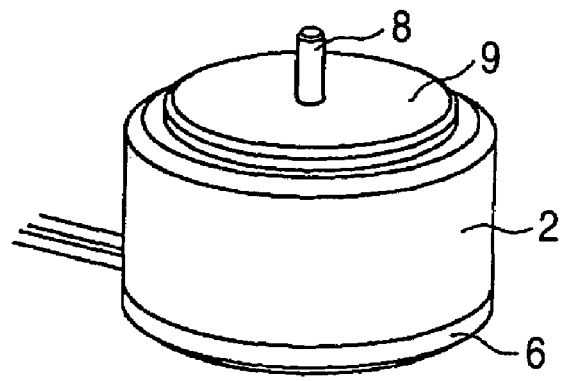
FIG. 2A illustrates a side sectional view and FIG. 2B illustrates an outline perspective view in a state of assembling the stepping motor of FIG. 1.
Figure 2B:
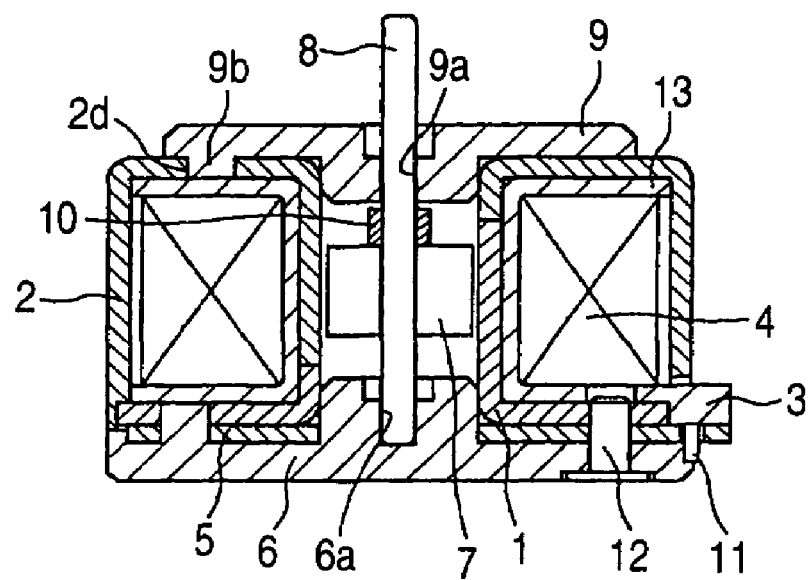

FIG. 1 is an exploded perspective view of a single phase PM type stepping motor of an embodiment according to the invention, and FIG. 2A is a side sectional view and FIG. 2B is an outlook perspective view in a state of integrating a stepping motor of FIG. 1.

As shown in FIG. 1 and FIG. 2, as to the single phase PM type stepping motor according to the embodiment, an impeller 14 having a plurality of blade portions such as an axial fan, a sirroco fan or the like is connected to an rotating shaft 8 of a single phase PM type stepping motor.

As to the single phase PM type stepping motor, a rotor magnet 7 that includes a permanent magnet in a cylindrical shape magnetized in a single pole (two poles divided equally in two by a diameter and magnetized to provide magnetic poles (S pole and N pole) symmetrically opposed to each other) and a spacer 10 for restricting a positional shift in an axial direction is fixed to the rotating shaft 8 to constitute a rotor (rotor).

The rotating shaft 8 of the rotor is rotatably supported by a pair of bearings 6a,9a integrated in an axial direction thereof. The bearing 6a projects from a center portion of a circular disk shape bracket 6 constituting one end face of a motor main body and rotatably supports one end portion of the rotating shaft 8 in a thrust direction. The bearing 9a is formed as a hole at a center portion of a bearing 9 having a circular disk shape and rotatably supports other end portion of the rotating shaft 8 in a radial direction. The bearing member 9 is fixed to an end face 2e of a yoke 2 in a shape of a cylinder having a bottom (cup-like shape) by press-fitting a projected portion 9b to an attaching hole 2d serving as a positioning function.

Meanwhile, a stator (stator) is provided with a coil 4 arranged to be opposed to the rotor magnet 7 concentrically therewith a predetermined clearance relative to the rotor magnet 7, and yokes 1, 2 as magnetic members surrounding to hold the coil 3 and having magnetic pole portions 1a,2a interposed between the rotor magnet 7 and the coil 4.

The yokes 1, 2 includes the first yoke 1 in a circular disk shape constituted by a thin plate, and the second yoke 2 in the shape of the cylinder having a bottom, an opening end portion 2f of which is closed by the first yoke 1. The first yoke 1 includes an opening portion 1b opened concentrically with a center axis of the rotating shaft 8 of the rotor, and the first magnetic pole portion 1a in a shape of a circular arc erected by drawing from a portion of a side edge portion of the opening portion 1b to a side of the coil 4. A bottom portion of the second yoke 2 includes an opening portion 2b opened concentrically with the center axis of the rotating shaft 8 of the rotor, and the first magnetic pole portion 2a in the circular arc shape erected by drawing from a portion of a side edge portion of the opening portion 2b to a side of the coil 4.

The first magnetic pole portion 1a and the second magnetic pole portion 2a are provided at positions symmetrical with each other relative to the rotating shaft 8 of the rotor.

As to the coil 4, a bobbin 13 made of a resin in a cylindrical shape having flanges 13a,13b having diameters that are enlarged at both ends thereof is wound with a wire so that an axis of the wound wire coincides with the rotating shaft 8 of the rotor.

Further, the flange 13b at one end of the bobbin 15 is formed with an electrode portion 3 elongated therefrom for electrical connection with the coil 4 to excite the coil 4 to thereby generate a magnetic field of S pole or N pole at the first and the second magnetic pole portions 1a,2a. A pair of electrode pins 11 electrically connected to respective end portions of the coil 4 is projected from the electrode portion 3. The electrode pins 11 are electrically connected to a circuit board 5 attached to a rear face of the first yoke 1 by solder and connected to an outside driving circuit for controlling energization of the coil 4 via a connector or the like. The circuit board 5 is formed with a wiring pattern to form a pulse voltage waveform applied to the coil 4.

The first yoke 1 and the second yoke 2 are mechanically coupled by fitting or the like in a state of containing the coil 4. Further, the bracket 6 is fixed by fastening a screw hole 1d of the first yoke 1 along with the circuit board 5 by a screw 12 or the like.

The first and the second magnetic pole portions 1a, 2a constitute magnetic poles 1 by being excited by the energization of the coil 4 and rotate the rotor magnet 7 by reversing polarities of the magnetic poles. Further, recessed grooves (or notches) 1c,2c are provided at portions of inner peripheral portions of the first and the second magnetic pole portions 1a,2a. The recessed grooves 1c,2c make a clearance between the first and the second magnetic pole portions 1a,2a and an outer peripheral portion of the rotor magnet 7 nonuniform, and form an electromagnetically stabilized position and a stabilized position when not excited (refer to "non-excited stabilized position", hereinafter) of the rotor magnet 7 to enable to rotate the rotor magnet 7 by self starting (refer to FIG. 5).

That is, at non-excited stabilized position, such a positional relationship is established in which a direction D1 (refer to FIG. 5A) of a magnetic flux generated between the first and the second magnetic pole portions 1a,2a in the excitation and a polarity direction D2 of the rotor magnet 7 are intersected to shift (not in parallel with each other) (refer to FIG. 5A, FIG. 5C and FIG. 5D) due to a cogging torque applied to the magnetic poles of the rotor magnet 7 from the first and the second magnetic pole portions 1a,2a.

At the electromagnetically stabilized position, the magnetic poles of the rotor magnet 7 are exerted with an attraction force and a repulsion force from the first and the second magnetic pole portions 1a,2a to balance, and such a positional relationship is established in which the polarities of the rotor magnet 7 are reversed from the nonexcited stabilized position by less than 180° (refer to FIG. 5B and FIG. 5D).

Figure 3:
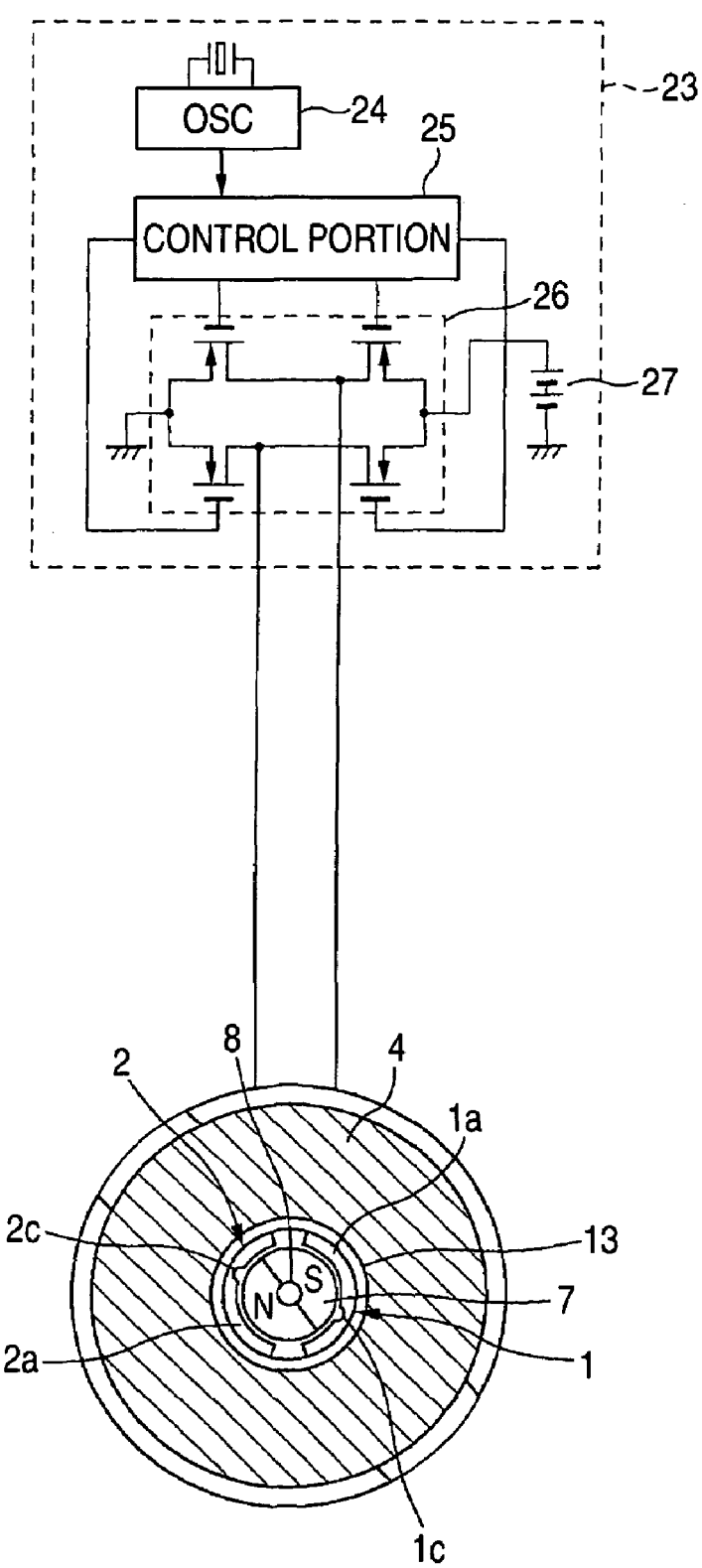
FIG. 3 is a block diagram showing a driving circuit of the embodiment according to the invention.
Figure 4:
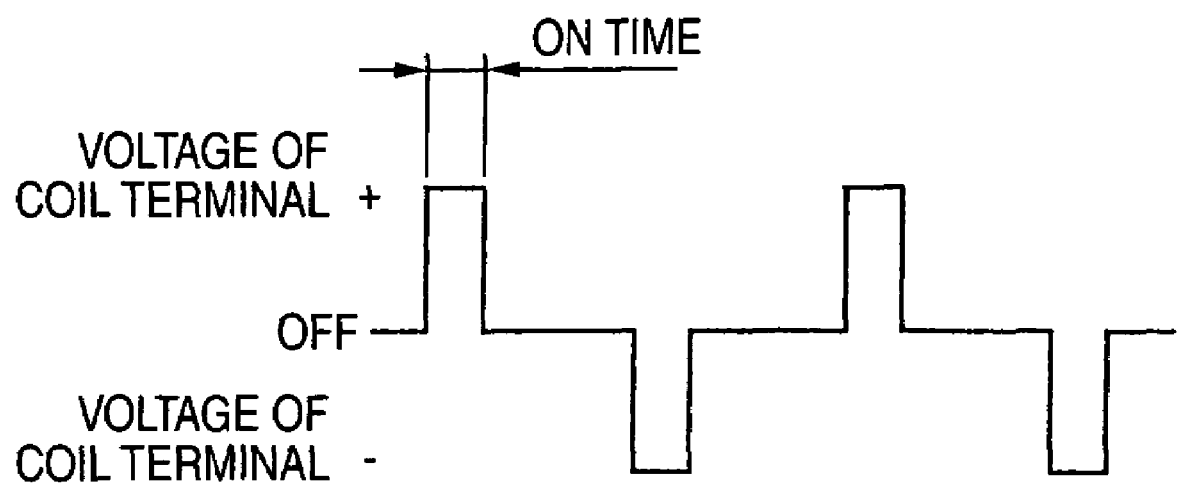
FIG. 4 is a diagram showing a waveform of a drive voltage of the stepping motor generated by the driving circuit of FIG. 3.

FIG. 3 is a block diagram showing a driving circuit of the embodiment according to the invention, and FIG. 4 is a diagram showing a voltage waveform of driving the fan motor generated by the driving circuit of FIG. 3.

As shown in FIG. 3, a driving circuit 25 includes 2 pieces of dry cells 27 as a power source, an oscillating circuit 24 for outputting a clock signal, a control portion 25 for dividing and shaping a waveform of the output clock signal to output a drive control signal to respective gates of CMOSFET 26 comprising 4 CMOS transistors, thereby a drive voltage having an alternating pulse waveform periodically reversed as shown in FIG. 4 to between terminals of the coil 7 so that the signal phase stepping motor is driven inconstant rotation. Further, according the embodiment, ON time of the drive voltage is, for example, 20 ms and the motor revolution number is 480 rpm.

Further, although FIG. 4 shows an example of setting a pulse frequency constant from starting, by setting the pulse frequency in starting to be lower than that in a steady state (slow up voltage waveform), a slow up function for gradually increasing the revolution number of the stepping motor from starting to steady state can be added and the impeller can be driven to rotate by low current.

The coil resistance of the single phase stepping motor of the embodiment is several hundreds ohm which is considerably larger than that of a general stepping motor, further, there is also a case in which a resistor having several hundreds ohm is connected in series and therefore a drive current becomes several mA.

Since an IC for a general purpose time piece can be used as the driving circuit 25, cost is inexpensive, current consumption is small, and driving for a long period of time can be carried out by using a dry cell similar to a timepiece or the like (for example, continuous driving of 40 days can be realized since the voltage is 3 V by 2 pieces of batteries, the current consumption is 2 mA, and the dry cell is provided with a capacity of 2000 mA)

FIGS. 5A to 5E illustrates views for explaining operation of rotating the fan motor according to the embodiment and showing a positional relationship between the first and the second magnetic pole portions 1a, 2a and the rotor magnet 7.

At the nonexcited stabilized position (energization OFF) of FIG. 6A, such a positional relationship is established in which the direction D1 of the magnetic flux generated between the first and the second magnetic pole portions 1a, 2a and the polarity direction D2 of the rotor magnet 7 are intersected to shift from each other since a very small cogging torque is applied to the magnetic poles of the rotor magnet 7 from the first and the second magnetic pole portions 1a, 2a. Although it is preferable to make the cogging torque as small as possible to weaken the magnetic field, the cogging torque is not nullified.

By exciting the first and the second magnetic pole portions 1a, 2a by energization (ON) of the coil 4 from the above-described nonexcited stabilized position, the first and the second magnetic pole portions 1a, 2a and the magnetic poles of the rotor magnet 7 having different polarities are attracted and the magnetic poles having the same polarity are repulsed to balance, and the rotor magnet 7 is rotated from the non-excited stabilized position of FIG. 5A to an electromagnetically stabilized position of FIG. 5B at which the polarities of the rotor magnet 7 are rotated in the clockwise direction by less than 180 degrees.

Thereafter, when energization of the coil 4 is stopped (OFF) by operation of the above-described cogging force, the rotor magnet 3 is slightly rotated further from the electromagnetically stabilized position of FIG. 5B to rotate to the non-excited stabilized position of FIG. 5C rotated from the position of FIG. 5A by 180 degrees.

Next, by generating polarities reverse to those in exciting the first and the second magnetic pole portions 1a, 2a by outputting a pulse reverse to that in energization of the coil 4 as shown by FIG. 5B from the non-excited stabilized position of FIG. 5C, the magnetic poles of the rotor magnet 7 having polarities different from those of the first and the second magnetic pole portions 1a, 2a are attracted and the magnetic poles having the same polarities are repulsed to each other to balance and the rotor magnet 7 is rotated to an electromagnetically stabilized position of FIG. 5D at which the polarities of the rotor magnet 7 are rotated in clockwise direction from the non-excited stabilized position of FIG. 5C by less than 180 degrees.

Thereafter, when energization of the coil 4 is stopped (OFF), by the operation of the above-described cogging force, the rotor magnet 7 returns to the position of FIG. 5A to finish one rotation by being rotated slightly further from the electromagnetically stabilized position of FIG. 65 to a non-excited stabilized position of FIG. 5E (position rotated from the position of FIG. 6C by 180 degrees or position rotated from the position of FIG. 6A by 360 degrees). By repeating a similar energization pattern thereafter, the rotor magnet 7 can continuously rotate.

According to the above-described embodiment, the rotor magnet 7 and the coil 4 are arranged concentrically relative to the rotating shaft 8 and therefore, in comparison with the constitution of the related art in which the rotor magnet and the coil are arranged unsymmetrically relative to the rotating shaft, a dead space caused by an outer shape of the coil yoke can be reduced and the stepping motor can be realized to drive to rotate by low current and at low revolution.

Further, when an impeller having a small moment of inertia is driven by using the stepping motor of the embodiment, a path for convecting air can be ensured.

The invention is applicable to, for example, a timepiece having a small moment of inertia, an air cleaner mounted with an electric fan for convecting air, an aromatic agent sprayer, a humidifier, an insecticide apparatus or the like as a driving motor.

What is claimed is:

1. A stepping motor comprising:
   a rotating shaft operable to rotate continuously;
   a magnet including only one permanent magnet magnetized in a single pole and arranged concentrically with the rotating shaft;
   only one coil wound so as to be concentric with the magnet and to be opposed to the magnet, a predetermined clearance being provided between the magnet and the coil; and
   a magnetic member that surrounds the coil and that comprises:
      a magnetic pole interposed between the magnet and the coil, wherein at least one of a recessed groove and a notch is formed at a portion of the magnetic pole, which is separated from an end portion of the magnetic pole so that cogging torque is applied to the magnet, and
   wherein the magnetic member enables the rotating shaft to self-start from a non-excited stabilized position in which the cogging torque is applied to the magnetic member when the magnet is attracted and repulsed due to an intersection of a direction of a magnetic flux generated when the magnetic pole is excited by an energization of the coil and a polarity direction of the magnet, enables the rotating shaft to rotate to an electromagnetically stabilized position in which the attraction and the repulsive force between the magnet and the magnetic pole are balanced, and enables the rotating shaft to rotate continuously by the attraction and the repulsive force by controlling the energization of the coil at the electromagnetically stabilized position and the non-excited stabilized position.

2. The stepping motor according to claim 1, wherein the magnetic member includes a first magnetic member in a shape of a thin plate provided with a first magnetic pole portion, and a second magnetic member in a shape of a cylinder provided with a second magnetic pole portion symmetrically with the first magnetic pole portion relative to a center axis of the magnet.

3. The stepping motor according to claim 2, wherein each of the first and the second magnetic pole portions are provided with said at least one of said recessed groove and said notch for making clearances between the first and the second magnetic pole portions and the magnet nonuniform, so that an electromagnetically stabilized position of the magnet when the single coil is excited and a stabilized position when the single coil is not excited are established.

4. The motor of claim 3, wherein the at least one of recessed grooves and notches are circumferentially offset from a circumferential center of said first and second magnetic pole portions.

5. The stepping motor of claim 4, wherein a fan is mounted on an end portion of the rotating member.

6. The stepping motor of claim 3, wherein the electromagnetically non-excited stabilized position and the electromagnetically excited stabilized position are circumferentially offset from each other by less than 180 degrees.

7. A stepping motor comprising:
   a rotating shaft operable to rotate continuously;
   a magnet including only one permanent magnet magnetized in a single pole and arranged concentrically with the rotating shaft;
   only one coil surrounding the magnet; and
   a magnetic member comprising a magnetic pole having at least one of a recessed groove and a notch circumferentially offset from a circumferential center and an end portion of the magnetic pole, so that cogging torque is applied to the magnet.
   wherein the magnetic member enables the rotating shaft to self-start from a non-excited stabilized position in which the cogging torque is applied to the magnetic member when the magnet is attracted and repulsed due to an intersection of a direction of a magnetic flux generated when the pole is excited by an energization of the coil and a polarity direction of the magnet, enables the rotating shaft to rotate to an electromagnetically stabilized position in which the attraction and the repulsive force between the magnet and the magnetic pole are balance, and enables the rotating shaft to rotate continuously by the attraction and the repulsive force by controlling the energization of the coil at the electromagnetically stabilized position and the non-excited stabilized position.

8. The motor of claim 7, wherein said at least one of the recessed groove and die notch provides a non-uniform clearance between the magnetic pole and the magnet.

9. The motor of claim 7, wherein said magnetic pole comprises a plurality of magnetic poles each comprising said at least one of the recessed groove and the notch.

10. The motor of claim 9, wherein the at least one of the recessed groove and the notch provides a non-uniform clearance between the plurality of magnetic poles and the magnet.

11. The motor of claim 10, wherein the non-uniform clearance forms an electromagnetically non-excited stabilized position and an electromagnetically excited stabilized position.

12. The motor of claim 11, wherein the electromagnetically non-excited stabilized position and the electromagnetically excited stabilized position are circumferentially offset from each other by less than 180 degrees.

13. The stepping motor of claim 9, wherein a fan is mounted on an end portion of the rotating member.

* * * * *